(12) United States Patent
Lyu et al.

(10) Patent No.: US 11,316,623 B2
(45) Date of Patent: Apr. 26, 2022

(54) METHOD AND DEVICE FOR TRANSMITTING DATA

(71) Applicant: Huawei Technologies Co., Ltd., Shenzhen (CN)

(72) Inventors: Yongxia Lyu, Ottawa (CA); Jingnan Wang, Beijing (CN); Ruixiang Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 157 days.

(21) Appl. No.: 16/673,645

(22) Filed: Nov. 4, 2019

(65) Prior Publication Data

US 2020/0067656 A1 Feb. 27, 2020

Related U.S. Application Data

(63) Continuation of application No. PCT/CN2018/085531, filed on May 4, 2018.

(30) Foreign Application Priority Data

May 5, 2017 (CN) .......................... 201710314184.2

(51) Int. Cl.
| | |
|---|---|
| H04L 1/16 | (2006.01) |
| H04L 1/18 | (2006.01) |
| H04L 5/00 | (2006.01) |
| H04W 28/06 | (2009.01) |
| H04W 72/04 | (2009.01) |

(52) U.S. Cl.
CPC .......... *H04L 1/1819* (2013.01); *H04L 1/1614* (2013.01); *H04L 1/1809* (2013.01); *H04L 1/1854* (2013.01); *H04L 1/1861* (2013.01); *H04L 5/0055* (2013.01); *H04W 28/06* (2013.01); *H04W 72/0446* (2013.01)

(58) Field of Classification Search
CPC ... H04L 1/1819; H04L 1/1614; H04L 1/1809; H04L 1/1854; H04L 1/1861; H04L 1/18; H04L 1/1812; H04L 1/16; H04L 1/1864; H04L 1/1896; H04L 5/0055; H04W 28/06; H04W 72/0446
See application file for complete search history.

(56) References Cited

U.S. PATENT DOCUMENTS

| | | | |
|---|---|---|---|
| 9,271,173 | B2 | 2/2016 | Xu et al. |
| 9,461,780 | B2 | 10/2016 | Liang et al. |

(Continued)

FOREIGN PATENT DOCUMENTS

| | | |
|---|---|---|
| CN | 101183918 A | 5/2008 |
| CN | 101388756 A | 3/2009 |

(Continued)

*Primary Examiner* — Kent Krueger
(74) *Attorney, Agent, or Firm* — Slater Matsil, LLP (57) ABSTRACT

This application provides a method and device for transmitting data. This is advantageous to improving data transmission efficiency. The method includes: sending, by a first device, indication information to a second device, where the indication information indicates a first sending manner for a first transport block, and the first sending manner is one of at least two sending manners; and sending, by the first device, the first transport block based on the first sending manner, or receiving, by the first device, the first transport block based on the first sending manner.

20 Claims, 5 Drawing Sheets

(56) References Cited

U.S. PATENT DOCUMENTS

| | | | |
|---|---|---|---|
| 9,980,255 B2 | 5/2018 | Cheng et al. | |
| 10,321,446 B2 | 6/2019 | Yang et al. | |
| 2013/0051266 A1 | 2/2013 | Kim et al. | |
| 2013/0051272 A1 | 2/2013 | Wiberg et al. | |
| 2015/0358122 A1* | 12/2015 | Yang | H04L 1/1822 370/280 |
| 2016/0165640 A1* | 6/2016 | Yang | H04W 74/08 370/336 |
| 2016/0261391 A1* | 9/2016 | Chen | H04L 1/1861 |
| 2016/0337108 A1 | 11/2016 | Choi et al. | |
| 2017/0034817 A1 | 2/2017 | Park et al. | |
| 2018/0175974 A1 | 6/2018 | Wu et al. | |
| 2018/0205534 A1* | 7/2018 | Yi | H04J 3/02 |

FOREIGN PATENT DOCUMENTS

| | | |
|---|---|---|
| CN | 101667900 A | 3/2010 |
| CN | 102378112 A | 3/2012 |
| CN | 102571265 A | 7/2012 |
| CN | 103368709 A | 10/2013 |
| CN | 104854944 A | 8/2015 |
| CN | 105227266 A | 1/2016 |
| CN | 106254043 A | 12/2016 |
| CN | 106550445 A | 3/2017 |
| CN | 2017031646 A1 | 3/2017 |
| CN | 106559183 A | 4/2017 |
| EP | 3518447 A1 | 7/2019 |
| WO | 2015105208 A1 | 7/2015 |
| WO | 2017031646 A1 | 3/2017 |

\* cited by examiner

METHOD AND DEVICE FOR TRANSMITTING DATA

CROSS-REFERENCE TO RELATED APPLICATIONS

This application is a continuation of International Application No. PCT/CN2018/085531, filed on May 4, 2018, which claims priority to Chinese Patent Application No. 201710314184.2, filed on May 5, 2017. The disclosures of the aforementioned applications are hereby incorporated by reference in their entireties

TECHNICAL FIELD

This application relates to the communication field, and more specifically, to a method and device for transmitting data.

BACKGROUND

In the prior art, a transmit end and a receive end receive or send a transport block in a default hybrid automatic repeat request (HARQ) sending manner. Specifically, after sending the transport block, the transmit end waits for feedback information that is sent by the receive end and that is used to indicate whether the transport block is received correctly. Then, based on the feedback information, the transmit end determines whether hybrid automatic repeat request (HARQ) retransmission needs to be performed for the transport block.

However, as mobile data traffic increases, there are massive mobile communication device connections, and various new services and application scenarios continuously emerge, a manner of transmitting a transport block based on the default HARQ sending manner is disadvantageous to efficient data transmission

SUMMARY

This application provides a method for transmitting data, which is advantageous to improving data transmission efficiency.

According to a first aspect, a method for transmitting data is provided. The method includes: sending, by a first device, indication information to a second device, where the indication information indicates a first sending manner for a first transport block, and the first sending manner is one of at least two sending manners; and sending, by the first device, the first transport block based on the first sending manner, or receiving, by the first device, the first transport block based on the first sending manner.

Compared with a default HARQ sending manner in the prior art, in the method in an embodiment of this application, a sending manner for sending the first transport block can be flexibly determined, and the first sending manner may be indicated to the second device through indication information, to enable the first device and the second device to perform data transmission based on the first sending manner. The solution is advantageous to flexibly determining the sending manner of the transport block by the first device, and therefore, is advantageous to improving data transmission efficiency.

Optionally, in a possible implementation, different sending manners correspond to different time domain resource patterns and/or different feeding-back manners.

Optionally, in a possible implementation, different sending manner have correspondences with parameters used to indicate channel quality, and the indication information includes channel quality information used to indicate channel quality between the first device and the second device.

Optionally, in a possible implementation, the first device may determine the first sending manner based on at least one of: channel quality between the first device and the second device, a service transmitted between the first device and the second device, a feedback latency of feedback information used to indicate whether a transport block is received correctly, a feedback latency of channel quality information, and a subcarrier spacing (or numerology) of a transport block between the first device and the second device.

In a possible implementation, the sending, by a first device, indication information to a second device includes: sending, by the first device, the indication information to the second device through physical layer signaling.

In the method of this embodiment of this application, the indication information is sent through physical layer signaling, which is advantageous to efficiently indicating the first sending manner by the first device to the second device.

In a possible implementation, the method further includes: sending, by the first device, higher-layer signaling to the second device, where the higher-layer signaling indicates a sending manner set, the sending manner set includes one or more sending manners in the at least two sending manners, and the first sending manner is one of the one or more sending manners included in the sending manner set.

In the method of this embodiment of this application, the first device may configure the sending manner set for the second device, which is advantageous to flexible data transmission performed by the first device and the second device.

In a possible implementation, the first device may determine the sending manner set based on at least one of: channel quality between the first device and the second device, a service transmitted between the first device and the second device, a feedback latency of feedback information used to indicate whether a transport block is received correctly, a feedback latency of channel quality information, and a subcarrier spacing (or numerology) of a transport block between the first device and the second device.

In a possible implementation, the sending, by the first device, the first transport block based on the first sending manner includes: sending, by the first device, the first transport block to the second device on the first time domain resource based on the first sending manner; receiving, by the first device, feedback information sent by the second device; and adjusting or suspending, by the first device, transmission on a $k^{th}$ time domain resource after the first time domain resource based on the feedback information, where k is a positive integer greater than or equal to 2.

In a possible implementation, the sending, by the first device, the first transport block based on the first sending manner includes: sending, by the first device, the first transport block to the second device on the first time domain resource based on the first sending manner; and sending, by the first device, update indication information to the second device, where the update indication information is used to indicate adjusting or suspending transmission on the $k^{th}$ time domain resource after the first time domain resource, and k is a positive integer greater than or equal to 2.

According to a second aspect, a method for transmitting data is provided. The method includes: receiving, by a second device, indication information sent by a first device, where the indication information indicates a first sending manner for a first transport block, and the first sending manner is one of at least two sending manners; and receiving, by the second device, the first transport block based on the first sending manner, or sending, by the second device, the first transport block based on the first sending manner.

In a possible implementation, the receiving, by a second device, indication information sent by a first device includes: receiving, by the second device by receiving physical layer signaling, the indication information sent by the first device.

In a possible implementation, the method further includes: receiving, by the second device, higher-layer signaling sent by the first device, where the higher-layer signaling indicates a sending manner set, the sending manner set includes one or more sending manners in the at least two sending manners, and the first sending manner is one of the one or more sending manners included in the sending manner set.

In a possible implementation, the receiving, by the second device, the first transport block based on the first sending manner includes: detecting and/or measuring, by the second device on the first time domain resource based on the first sending manner, the first transport block sent by the first device; and sending, by the second device, feedback information to the first device based on at least one of a detection result and a measurement result.

In a possible implementation, the receiving, by the second device, the first transport block based on the first sending manner includes: detecting, by the second device on the first time domain resource based on the first sending manner, the first transport block sent by the first device; and the method further includes: receiving, by the second device, update indication information sent by the first device, where the update indication information is used to indicate adjusting or suspending transmission on a $k^{th}$ time domain resource after the first time domain resource, and k is a positive integer greater than or equal to 2.

In a possible implementation, the higher-layer signaling indicates the sending manner set by indicating a time domain resource pattern of each sending manner in the one or more sending manners, and one or more resources indicated by the time domain resource pattern are for a same transport block.

In a possible implementation, the higher-layer signaling indicates a time domain resource pattern of at least one sending manner in the one or more sending manners through a bitmap; and/or the higher-layer signaling indicates the time domain resource pattern of the at least one sending manner in the one or more sending manners by indicating a quantity of time domain units.

Optionally, in a possible implementation, a length of the bitmap is related to an average latency requirement, a longest latency requirement, a current transmission latency requirement, and/or a feedback latency.

In a possible implementation, the higher-layer signaling is further used to indicate a feeding-back manner corresponding to each sending manner in the one or more sending manners, and the feeding-back manner includes performing ACK feeding-back and skipping performing NACK feeding-back, skipping performing ACK feeding-back and skipping performing NACK feeding-back, or performing ACK feeding-back and performing NACK feeding-back.

In a possible implementation, the indication information is further used to indicate a first feeding-back manner corresponding to the first sending manner.

According to a third aspect, this application provides a device for transmitting data, configured to perform the method according to the first aspect or any possible implementation of the first aspect. Specifically, the device includes a unit configured to perform the method according to the first aspect or any possible implementation of the first aspect.

According to a fourth aspect, this application provides a device for transmitting data, configured to perform the method according to the second aspect or any possible implementation of the second aspect. Specifically, the device includes a unit configured to perform the method according to the second aspect or any possible implementation of the second aspect.

According to a fifth aspect, this application provides a device for transmitting data. The device includes one or more processors, one or more memories, and one or more transceivers (each transceiver includes a transmitter and a receiver). The transmitter or the receiver is connected to one or more antennas, and sends and receives signals through the antenna. The memory is configured to store a computer program instruction (or code). The processor is configured to execute an instruction pattern stored in the memory, and when the instruction is executed, the processor performs the method according to the first aspect or any possible implementation of the first aspect.

According to a sixth aspect, this application provides a device for transmitting data. The device includes one or more processors, one or more memories, and one or more transceivers (each transceiver includes a transmitter and a receiver). The transmitter or the receiver is connected to one or more antennas, and sends and receives signals through the antenna. The memory is configured to store a computer program instruction (or code). The processor is configured to execute an instruction stored in the memory, and when an instruction is executed, the processor performs the method according to the second aspect or any possible implementation of the second aspect.

According to a seventh aspect, this application provides a computer-readable storage medium. The computer-readable storage medium stores an instruction, and when the instruction is run on a computer, the computer is enabled to perform the method according to the first aspect or any possible implementation of the first aspect.

According to an eighth aspect, this application provides a computer-readable storage medium. The computer-readable storage medium stores an instruction, and when the instruction is run on a computer, the computer is enabled to perform the method according to the second aspect or any possible implementation of the second aspect.

In the technical solutions provided in this application, the first sending manner for sending the first transport block is flexibly determined, and the first sending manner is indicated to the second device through the indication information. This solution is advantageous to flexibly selecting a sending manner by the first device and the second device, and is further advantageous to improving data transmission efficiency.

DETAILED DESCRIPTION OF ILLUSTRATIVE EMBODIMENTS

The following describes technical solutions of this application with reference to accompanying drawings.

It should be understood that, division of manners, cases, and types in embodiments of this application is merely for the convenience of description, and should not constitute a particular limitation. Features in the various manners, types, and cases may be combined with each other if no conflict occurs.

It should also be understood that "first", "second", and "third" in the embodiments of this application are merely used for distinction, and shall not constitute any limitation on this application.

In the embodiments of this application, a network device is an apparatus that is deployed in a radio access network and that is configured to provide a radio communication function for a terminal device. The network device may include a base station, a macro base station, a micro base station (also referred to as a small cell), a relay station, an access point, or the like in various forms. A device having a base station function may have different names in systems using different radio access technologies. For example, a network device may be an access point (AP) in a WLAN, or may be a base transceiver station (BTS) in GSM or CDMA, or may be an evolved NodeB (eNB or eNodeB) in an LTE system. Alternatively, a network device may be a NodeB in a 3rd generation (3G) system. In addition, the network device may alternatively be a relay station, an access point, a vehicular device, a wearable device, a network device in a future 5G network, a network device in a future evolved PLMN network, or the like. For ease of description, in all the embodiments of this application, all the foregoing apparatuses that provide a radio communication function for an MS are collectively referred to as a network device.

In the embodiments of this application, a terminal device may also be referred to as user equipment (UE), an access terminal, a subscriber unit, a subscriber station, a mobile, a mobile station (MS), a remote station, a remote terminal, a mobile device, a user terminal, a terminal, a radio communication device, a user agent, or a user apparatus.

As an example rather than a limitation, the terminal device included in the embodiments of this application may include various handheld devices having a radio communication function, a vehicular device, a wearable device, a computing device, or another processing device connected to a wireless modem. The terminal device may alternatively include a subscriber unit, a cellular phone, a smartphone, a wireless data card, a personal digital assistant (PDA) computer, a tablet computer, a wireless modem, a handheld device (handset), a laptop computer, a machine type communication (MTC) terminal, or a station (ST) in a wireless local area network (WLAN). The terminal device may be a cellular phone, a cordless telephone, a Session Initiation Protocol (SIP) telephone, a wireless local loop (WLL) station, a terminal device in a next-generation communication system, for example, in a fifth-generation (5G) communication network, or a terminal device in a future evolved public land mobile network (PLMN) network.

With reference to FIG. 1 to FIG. 4, a method for sending data in an embodiment of this application is described below in detail.

Figure 1:
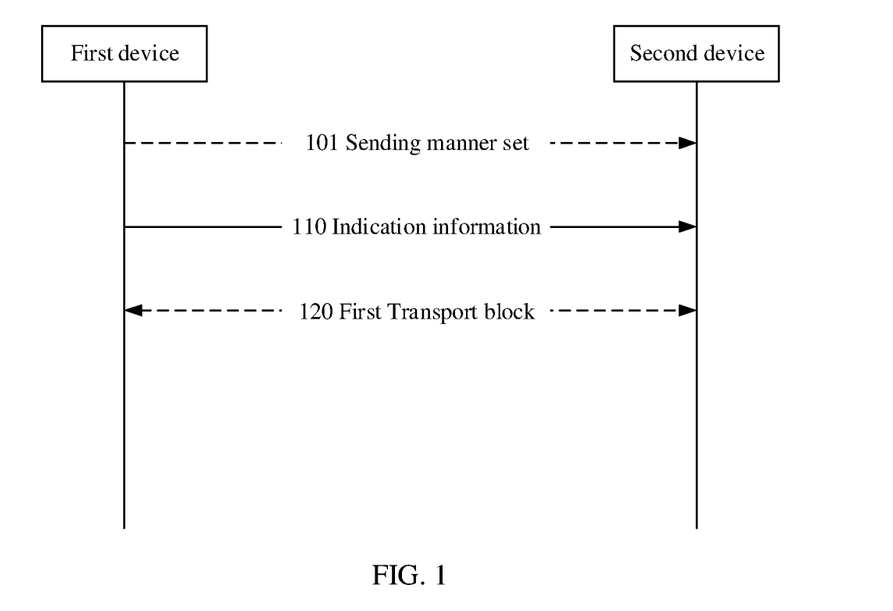
FIG. 1 is a schematic interaction diagram of an example of a method for transmitting data according to an embodiment of this application.

FIG. 1 is a schematic interaction diagram of a method for transmitting data according to an embodiment of this application. It should be understood that FIG. 1 shows detailed steps or operations of the method for transmitting data, but the steps or operations are merely used as an example, and other operations or transformations of various operations in FIG. 1 may be further performed in this embodiment of this application.

The method 100 may be performed by a first device and a second device. Optionally, in this embodiment of this application, the first device may be a network device, and the second device may be a terminal device; or the first device may be a terminal device, and the second device may be a network device.

As shown in FIG. 1, the method 100 may include 110 and 120.

110. The first device sends indication information to the second device, and correspondingly, the second device receives the indication information sent by the first device, where the indication information indicates a first sending manner for a first transport block, and the first sending manner is one of at least two sending manners.

120. The first device sends the first transport block based on the first sending manner, and correspondingly, the second device detects the first transport block based on the first sending manner.

The transport block in this embodiment of this application is similar to a transport block (TB) in an LTE system. One transport block is one data block that includes a MAC PDU, and the data block may be transmitted in one TTI.

Specifically, the first device may (for example, based on some conditions) determine the first sending manner, and the first device may indicate the first sending manner to the second device after determining the first sending manner, to enable the first device and the second device to perform data transmission based on the first sending manner.

Compared with transmitting a transport block by a transmit end and a receive end in a default HARQ sending manner in the prior art, in the method in this embodiment of this application, the first device may determine the first sending manner, the first sending manner is one of the at least two sending manners, and the first device communicates with the second device based on the first sending manner. The method is advantageous to improving data transmission efficiency to meet different latency requirements.

The first device may use an explicit indicator or an implicit indicator when indicating the first sending manner to a second terminal device through indication information.

In an optional example, the indication information is used to indicate the first sending manner.

In another optional example, a sending manner may correspond to some parameters. In this case, the first device sends the parameters, and the second device can determine the first sending manner after receiving the parameters. The parameters may include a parameter used to indicate channel quality, and may include a channel quality indicator CQI, a signal to interference plus noise ratio SINR, a signal to interference ratio SIR, a block error ratio (BLER), or a modulation and coding scheme MCS level (the MCS may include a quantity of repetitions).

Further, 110 may include: sending, by the first device, the indication information to the second device through physical layer signaling; and correspondingly, receiving, by the second device through the physical layer signaling, the indication information sent by the first device.

It should be understood that 110 and 120 may occur in different time domain units. For example, the first device sends the indication information in a TTI #1, and sends the first transport block in a TTI #2, where the TTI #1 is before the TTI #2 in terms of time domain. 110 and the 120 may alternatively occur in a same time domain unit. For example, the first device sends the indication information in a TTI #1, and sends the first transport block in the TTI #1.

It should be understood that the time domain unit may be a unit of a time domain resource that can be scheduled. The time domain unit may be a transmission time interval (TTI) or a short transmission time interval (sTTI). Further, the domain unit may be a subframe, a slot, a mini-slot, or a symbol, or may be a plurality of subframes, a plurality of slots, a plurality of mini-slots, or a plurality of symbols.

It should be understood that if the first transport block is downlink data, the first sending manner may be determined by a network device, and be indicated to a terminal device through indication information. If the first transport block is uplink data, the first sending manner may be determined by a network device, and be indicated to a terminal device through indication information, or the first sending manner may be determined by a terminal device and be indicated to a network device through indication information.

It is described above that the first device may send the indication information to the second device, so that the first device and the second device communicate with each other in one sending manner of the at least two sending manners.

Moreover, the method 100 may further include:

101. The first device sends higher-layer signaling to the second device, where the higher-layer signaling indicates a sending manner set, and the sending manner set includes one or more sending manners in the at least two sending manners, and correspondingly, the second device receives the higher-layer signaling sent by the first device.

It should be noted that the sending manner set in this embodiment of this application means that the higher-layer signaling can indicate one or more sending manners, and shall not constitute any limitation on this application. For example, the one or more sending manners may be in a table form or another form.

The one or more sending manners indicated by the higher-layer signaling include the first sending manner. Further, optionally, the higher-layer signaling may be radio resource control (RRC) signaling.

Optionally, the higher-layer signaling may be used to indicate at least one type of the following information:

1. Time Domain Resource Pattern

The higher-layer signaling may be used to indicate a time domain resource pattern corresponding to each sending manner in the sending manner set. One or more resources indicated by the time domain resource pattern are for a same transport block (that is, corresponding to the transport block). Using an example in which a unit of a resource indicated by the time domain resource pattern is a TTI, the time domain resource pattern may be a plurality of types of resources.

Figure 2:
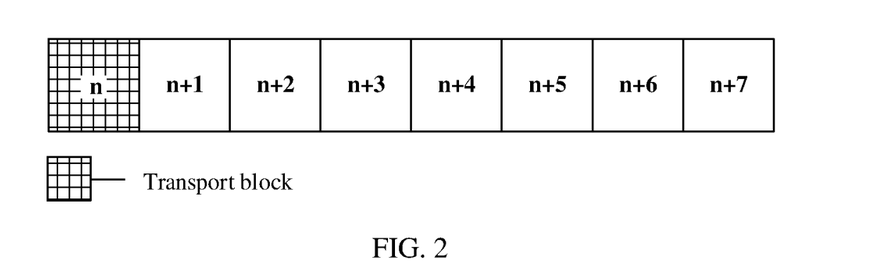
FIG. 2 is a schematic diagram of an example of a time domain resource pattern according to an embodiment of this application.

For example, a resource indicated by the time domain resource pattern may be one time domain unit (the one time domain unit may be one TTI). FIG. 2 is a schematic diagram of an example of a time domain resource pattern according to an embodiment of this application. In the time domain resource pattern shown in FIG. 2, a transport block corresponds to one time domain unit.

Figure 3:
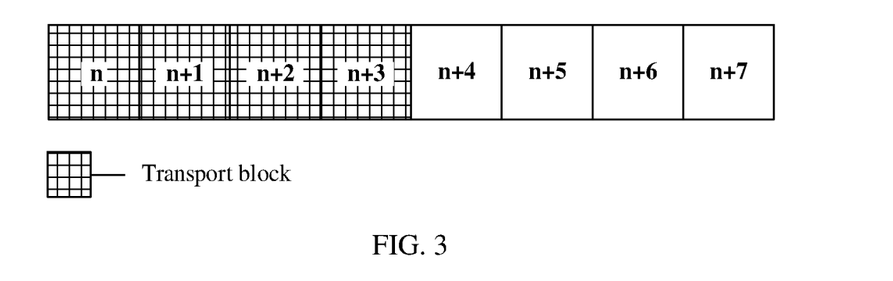
FIG. 3 is a schematic diagram of another example of a time domain resource pattern according to an embodiment of this application.

For another example, a resource indicated by the time domain resource pattern may be a plurality of successive time domain units. FIG. 3 is a schematic diagram of another example of a time domain resource pattern according to an embodiment of this application. In the time domain resource pattern shown in FIG. 3, in the time domain resource pattern, a same transport block corresponds to four successive time domain units.

Figure 4:
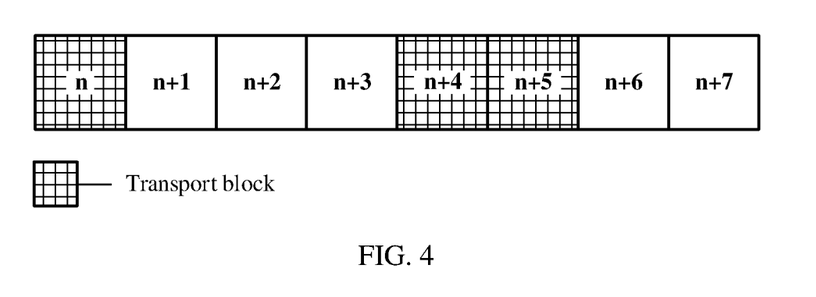
FIG. 4 is a schematic diagram of still another example of a time domain resource pattern according to an embodiment of this application.
Figure 5:
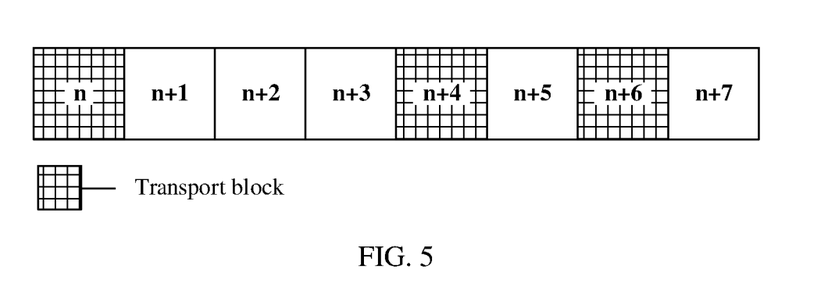
FIG. 5 is a schematic diagram of yet another example of a time domain resource pattern according to an embodiment of this application.

For still another example, a resource indicated by the time domain resource pattern may be a plurality of non-successive time domain units. Further, the plurality of non-successive time domain units may further be partially non-successive or completely non-successive. For example, FIG. 4 is a schematic diagram of still another example of a time domain resource pattern according to an embodiment of this application. As shown in FIG. 4, the time domain resource pattern may include a plurality of time domain units for a same transport block, and some of the plurality of the time domain units are non-successive. FIG. 5 is a schematic diagram of yet another example of a time domain resource pattern according to an embodiment of this application. As shown in FIG. 5, the time domain resource pattern may include a plurality of time domain units, and any two domain units in the plurality of time domain units are non-successive.

It should be noted that the plurality of the non-successive time domain units may be evenly spaced or unevenly spaced, and this is not limited in this embodiment of this application.

Further, the higher-layer signaling may further indicate each time domain resource pattern in a plurality of manners.

For example, the higher-layer signaling may indicate each time domain resource pattern through a bitmap. That is, higher-layer signaling may carry a bitmap, and different bitmaps correspond to different patterns. For example, a bitmap of 10000000 indicates the pattern shown in FIG. 2, a bitmap of 11110000 indicates the pattern shown in FIG. 3, and so on. Further, a length of a bitmap is further related to an average latency requirement, a longest latency requirement, a current transmission latency requirement, and/or a feedback latency.

For another example, the higher-layer signaling may separately indicate a quantity of repetitions and a repetition interval for indicating each time domain resource pattern.

For still another example, the higher-layer signaling may indicate each time domain resource pattern by indicating a quantity of time domain units. For example, the higher-layer signaling may indicate the time domain resource pattern shown in FIG. 2 by indicating that the quantity of time domain units is one. For another example, the higher-layer signaling may indicate the time domain resource pattern shown in FIG. 3 by indicating the quantity of the time domain units is four.

In an optional example, the higher-layer signaling may indicate the sending manner set by indicating a time domain resource pattern of each sending manner in the sending manner set. That is, each sending manner corresponds to a different time domain resource pattern, and the higher-layer signaling indicates at least one sending manner by indicating at least one time domain resource pattern in a one-to-one correspondence manner.

2. Feeding-Back Manner

The higher-layer signaling may be used to indicate a feeding-back manner corresponding to each sending manner in the one or more sending manners. The feeding-back manner at least may include the following types:

2a. Feeding-Back Manner #A

Perform ACK feeding-back and skip performing NACK feeding-back.

In the feeding-back manner #A, a first device may send a first transport block to a second device through at least one time domain unit. If the second device successfully receives the first transport block, the second device may feed back an ACK to the first device, and correspondingly, after receiving the ACK, the first device may stop subsequently sending the first transport block.

2b. Feeding-Back Manner #B

Skip performing ACK feeding-back and skip performing NACK feeding-back.

In the feeding-back manner #B, a first device may send a first transport block to a second device through N (N is greater than or equal to 1) time domain units. Regardless of whether the second device receives the first transport block, the second device does not need to feed back an ACK or a NACK.

2c. Feeding-Back Manner #C

Perform ACK feeding-back and perform NACK feeding-back.

In the feeding-back manner #C, a first device may send a first transport block to a second device through at least one time domain unit. If the second device successfully receives the first transport block, the second device feeds back an ACK, or if the second device fails to receive the first transport block, the second device feeds back a NACK.

In another optional example, the higher-layer signaling may indicate the sending manner set by indicating a feeding-back manner of each sending manner in the sending manner set. That is, each sending manner corresponds to a different feeding-back manner, and at least one sending manner indicated by the higher-layer signaling has a one-to-one correspondence with at least one feeding-back manner.

Optionally, in an embodiment of this application, the higher-layer signaling may be used to indicate the time domain resource pattern corresponding to each sending manner in the sending manner set and the feeding-back manner corresponding to each sending manner. Different sending manners may indicate different time domain resource patterns and/or different feeding-back manners.

Optionally, the sending manner in an embodiment of this application may include a plurality of types of sending manners. For example, a HARQ manner, a one-shot sending (one shot) manner, and a repeated sending (Repetition) manner may be included.

The one-shot sending manner may mean that a first device sends a first transport block in N successive time domain units, and does not perform retransmission of the first transport block subsequently (for example, a time domain resource pattern of the one-shot sending manner may be shown in FIG. 3).

The repeated sending manner may mean that a first device sends a first transport block in a plurality of reserved time domain units, and when receiving an ACK or a channel state information feedback, the first device may stop sending the first transport block in a subsequent time domain unit (for example, a time domain resource pattern of the repeated sending manner may be shown in FIG. 4).

In both of the repeated sending manner and the HARQ, retransmission may be performed. However, for the HARQ, a resource for retransmission is rescheduled based on a NACK, and for the repeated sending manner, a resource for retransmission is reserved.

In an optional example, in this embodiment of this application, different sending manners may correspond to different types. For example, the at least two sending manners may include the HARQ, the one-shot sending manner, and the repeated sending manner. If the first sending manner can indicate the repeated sending manner, the first device and the second device transmit the first transport block based on the HARQ.

Further, the first device may determine the first sending manner based on a plurality of factors. Optionally, the first device may determine the sending manner set based on at least one of: channel quality between the first device and the second device, a service transmitted between the first device and the second device, a feedback latency of feedback information used to indicate whether a transport block is received correctly, a feedback latency of channel quality information, and a subcarrier spacing (or numerology) of a transport block between the first device and the second device.

For example, when in a range of a service latency requirement, transmission of Q retransmissions (for example, a maximum quantity of transmission times of a physical layer) can be supported, and there is a feedback resource, the first sending manner may be determined as the HARQ. When in a range of a service latency requirement, there is no time to provide a feedback (including a case caused by a lack of feedback resources), the first sending manner may be determined as the one-shot sending manner. When in a range of a service latency requirement, transmission of Q retransmissions (for example, a maximum quantity of transmission times of a physical layer) cannot be supported, and there is a feedback resource, the first sending manner may be determined as the repeated sending manner.

For another example, when a latency requirement of a service is 100 ms, in each millisecond of the 100 ms, in which the service is transmitted, there are enough downlink data resources and uplink feedback resources, and an interval between initial transmission and retransmission is 8 ms, it can be learned that the service can be repeatedly transmitted four times or more in the latency requirement, so that the first device determines the first sending manner as the HARQ. When a service whose a latency requirement is 0.5 ms (four slots) is transmitted by using a resource whose slot=⅛ ms, based on a typical transmission-feedback time sequence relationship (initial transmission occurs in a slot n, and feeding-back occurs in a slot n+3), initial transmission occurs in a first slot, and feeding-back occurs in a fourth slot. In this case, the latency requirement is met, that is, a maximum quantity of transmission times is reached, and the feeding-back does not save resources, so that the first device determines the first sending manner as the one-shot sending manner. When a service whose a latency requirement is 1 ms is transmitted by using a resource whose TTI=⅛ ms, but there are enough downlink data resources and uplink feedback resources within 1 ms after service transmission is started, the first device determines the first sending manner as the repeated sending manner.

For still another example, when a latency requirement of a service is 1 ms, in each ⅛ ms of the 1 ms, in which the service is transmitted, there are enough downlink data resources and uplink feedback resources, and an interval between initial transmission and retransmission is ⅝ ms, the first network device may perform real-time scheduling upon arrival of the service, so that even the HARQ is adopted, there are still two transmission occasions. Therefore, the first device may determine the first sending manner as the HARQ. If the first device does not perform resource scheduling until ⅝ ms, the first device may determine the first sending manner as the one-shot sending manner. If the first device does not perform resource scheduling until ⅔ ms, the first device may determine the first sending manner as the repeated sending manner.

In another optional example, in this embodiment of this application, different sending manners may correspond to different time domain resource patterns. Assuming that the at least two sending manners include the pattern shown in FIG. 3 and the pattern shown in FIG. 4, and a service corresponding to a first transport block has a relatively short latency, the first device may determine the first sending manner as the sending manner #2 to reduce a transmission latency.

It should be noted that the indication information may be used to indicate the first sending manner. Further, the indication information may be used to indicate another parameter, and the another parameter corresponds to the first sending manner. For example, the first device may send indication information used to indicate an MCS level to the second device, where the MCS level corresponds to a sending manner, and the second device may determine a first sending manner based on the MCS level.

It is described above that the first device may determine the first sending manner based on a plurality of factors. Likewise, if the first device is a network device, the network device may configure different sending manner sets for a terminal device based on a plurality of factors.

In an optional example, the first device may determine the sending manner set according to at least one of: channel quality between the first device and the second device, a service transmitted between the first device and the second device, a feedback latency of feedback information used to indicate whether a transport block is received correctly, a feedback latency of channel quality information, and a subcarrier spacing (or numerology) of a transport block between the first device and the second device.

Figure 6:
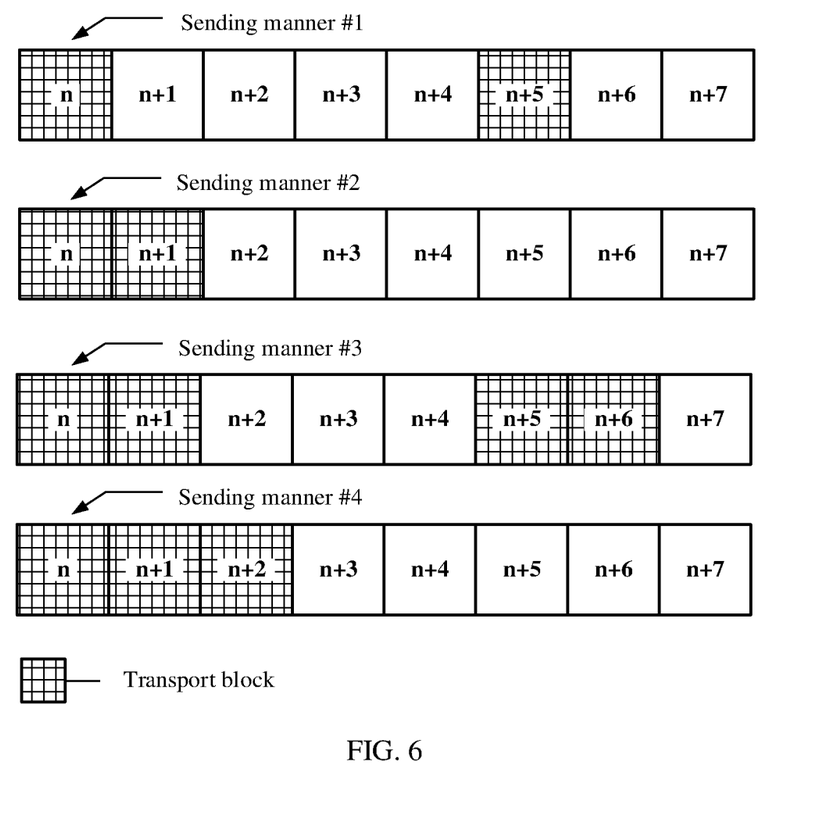
FIG. 6 is a schematic diagram of yet another example of a time domain resource pattern according to an embodiment of this application.

It should be understood that the network device may configure different sending manner sets for different terminal devices. For example, assuming that the network device configures sending manner sets for a terminal device #A and a terminal device #B, the terminal device #A is located in a central area of a cell, and the terminal device #B is located in an edge area of the cell. As shown in FIG. 6, one sending manner set configured by the network device for the terminal device #A may include a sending manner #1 and a sending manner #2, and a sending manner set configured by the network device for the terminal device #B may include a sending manner #3 and a sending manner #4.

Further, the foregoing higher-layer signaling that is used to indicate a time domain resource pattern without indicating a feeding-back manner may be recorded as first higher-layer signaling.

The method 100 may further include:

102. The first device sends second higher-layer signaling to the second device, where the second higher-layer signaling indicates a feeding-back manner set, and the feeding-back manner set includes at least one feeding-back manner, and correspondingly, the second device receives the second higher-layer signaling sent by the first device.

The indication information may further be used to indicate a first feeding-back manner in the feeding-back manner set, where the first feeding-back manner may be a feeding-back manner corresponding to the first sending manner, or the first feeding-back manner may be a feeding-back manner selected by the first device based on some conditions or factors.

In an optional example, 120 may include:

sending, by the first device, the first transport block to the second device on the first time domain resource based on the first sending manner; and correspondingly, detecting, by the second device, the first transport block on the first time domain resource based on the first sending manner;

sending, by the second device, feedback information to the first device based on a detection result; and correspondingly, receiving, by the first device, the feedback information sent by the second device; and adjusting or suspending, by the first device, transmission on the $k^{th}$ time domain resource after the first time domain resource based on the feedback information.

Specifically, the feedback information may include at least one of: first feedback information and second feedback information. The first feedback information is used to indicate that the first transport block is correctly received or the first transport block is not correctly received. The second feedback information is used to indicate channel quality of the first time domain resource. Specifically, the second feedback information may include at least one type of the information, such as a CQI, a SINR, a SIR, an MCS level (may include information of a quantity of repetitions), and an absolute value or a bias value of a BLER, for indicating the channel quality.

For example, assuming that the feedback information includes first feedback information, if the second device detects the first transport block, the second device may feed back an ACK, and the first device may stop sending the first transport block after receiving the ACK. If the second device skips detecting the first transport block, the second device may feed back a NACK, and after the first device receives the NACK, if a feeding-back manner corresponding to the first sending manner is the HARQ, the first device may transmit, based on scheduling, the first transport block on a $k^{th}$ time domain resource, where a value of k is related to a quantity of processes of the HARQ; and if a $k^{th}$ time domain unit in a time domain resource pattern corresponding to the first sending manner is a reserved time domain unit, the first device may send data on the $k^{th}$ time domain unit.

For another example, assuming that the feedback information includes second feedback information, the first device may adjust a sending parameter based on the second feedback information, and send the first transport block on a second resource by using the adjusted parameter. The sending parameter includes at least one of: a modulation manner, a coding manner, and transmission duration. The first device may adjust the sending parameter based on the channel quality. This is advantageous to improving sending efficiency of the first transport block.

In another optional example, 120 may include:

sending, by the first device, the first transport block to the second device on the first time domain resource based on the first sending manner, and correspondingly, detecting, by the second device, the first transport block on the first time domain resource based on the first sending manner; and sending, by the first device, update indication information to the second device, and correspondingly, receiving, by the second device, the update indication information sent by the first device.

Specifically, the update indication information may be used to indicate adjusting or suspending transmission on the $k^{th}$ time domain resource after the first time domain resource.

Specifically, the update indication information may include at least one of transmission suspension information and MCS update information.

Specifically, the first device may send the update indication information to the second device based on factors such as channel quality and a service latency requirement.

Figure 7:
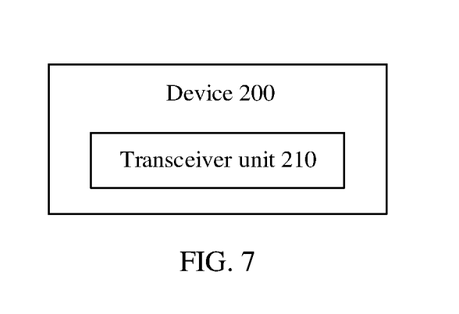
FIG. 7 is a schematic diagram of an example of a device for transmitting data according to an embodiment of this application.

FIG. 7 is a schematic diagram of an example of a device for transmitting data according to an embodiment of this application. As shown in FIG. 7, a device 200 for transmitting data is provided, where the device 200 includes: a transceiver unit 210.

The transceiver unit 210 is configured to: send indication information to a second device, where the indication information indicates a first sending manner for a first transport block, and the first sending manner is one of at least two sending manners; and send the first transport block based on the first sending manner or receive the first transport block based on the first sending manner.

Optionally, the transceiver unit 210 is specifically configured to: send the indication information to the second device through a physical layer signaling.

Optionally, the transceiver unit 210 is further configured to: send higher-layer signaling to the second device, the higher-layer signaling indicates a sending manner set, the sending manner set includes one or more sending manners in the at least two sending manners, and the first sending manner is one of the one or more sending manners included in the sending manner set.

Optionally, the higher-layer signaling indicates the sending manner set by indicating a time domain resource pattern of each sending manner in the one or more sending manners, and one or more resources indicated by the time domain resource pattern are for a same transport block.

Optionally, the higher-layer signaling indicates a time domain resource pattern of at least one sending manner in the one or more sending manners through a bitmap; and/or the higher-layer signaling indicates the time domain resource pattern of the at least one sending manner in the one or more sending manners by indicating a quantity of time domain units.

Optionally, the higher-layer signaling is further used to indicate a feeding-back manner corresponding to each sending manner in the one or more sending manners, and the feeding-back manner includes performing ACK feeding-back and skipping performing NACK feeding-back, skipping performing ACK feeding-back and skipping performing NACK feeding-back, or performing ACK feeding-back and performing NACK feeding-back.

Optionally, the indication information is further used to indicate a first feeding-back manner corresponding to the first sending manner.

Optionally, the transceiver unit 210 is specifically configured to: send the first transport block to the second device on a first time domain resource based on the first sending manner; receive feedback information sent by the second device; and adjust or suspend transmission on a $k^{th}$ time domain resource after the first time domain resource based on the feedback information, where k is a positive integer greater than or equal to 2.

Optionally, the transceiver unit 210 is specifically configured to: send the first transport block to the second device on the first time domain resource based on the first sending manner; and send update indication information to the second device, where the update indication information is used to indicate adjusting or suspending transmission on the $k^{th}$ time domain resource after the first time domain resource, and k is a positive integer greater than or equal to 2.

All units in the device 200 provided in this application and the foregoing other operations or functions are separately used to implement corresponding procedures performed by the first device in the method 100 provided in this application. For brevity, details are not described herein again.

Figure 8:
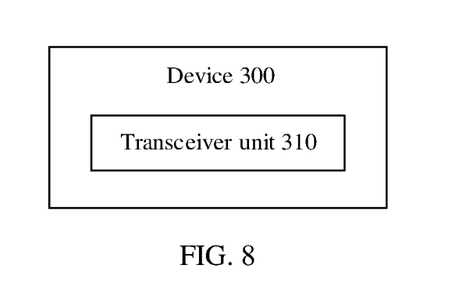
FIG. 8 is a schematic diagram of an example of a device for transmitting data according to an embodiment of this application.

FIG. 8 is a schematic diagram of an example of a device for transmitting data according to an embodiment of this application. As shown in FIG. 8, a device 300 for transmitting data is provided, where the device 300 includes: a transceiver unit 310, and the transceiver unit 310 is configured to: receive indication information sent by a first device, where the indication information indicates a first sending manner for a first transport block, and the first sending manner is one of at least two sending manners; and receive the first transport block based on the first sending manner, or send the first transport block based on the first sending manner.

Optionally, the transceiver unit 310 is specifically configured to: receive physical layer signaling, to receive the indication information sent by the first device.

Optionally, the transceiver unit 310 is further configured to: receive higher-layer signaling sent by the first device, the higher-layer signaling indicates a sending manner set, the sending manner set includes one or more sending manners in the at least two sending manners, and the first sending manner is one of the one or more sending manners included in the sending manner set.

Optionally, the higher-layer signaling indicates the sending manner set by indicating a time domain resource pattern of each sending manner in the one or more sending manners, and one or more resources indicated by the time domain resource pattern are for a same transport block.

Optionally, the higher-layer signaling indicates a time domain resource pattern of at least one sending manner in the one or more sending manners through a bitmap; and/or the higher-layer signaling indicates the time domain resource pattern of the at least one sending manner in the one or more sending manners by indicating a quantity of time domain units.

Optionally, the higher-layer signaling is further used to indicate a feeding-back manner corresponding to each sending manner in the one or more sending manners, and the feeding-back manner includes performing ACK feeding-back and skipping performing NACK feeding-back, skipping performing ACK feeding-back and skipping performing NACK feeding-back, or performing ACK feeding-back and performing NACK feeding-back.

Optionally, the indication information is further used to indicate a first feeding-back manner corresponding to the first sending manner.

Optionally, the transceiver unit 310 is specifically configured to: detect and/or measure, on the first time domain resource based on the first sending manner, the first transport block sent by the first device; and send feedback information to the first device based on at least one of a detection result and a measurement result.

Optionally, the transceiver unit 310 is specifically configured to: detect, on the first time domain resource based on the first sending manner, the first transport block sent by the first device; and receive update indication information sent by the first device, where the update indication information is used to indicate adjusting or suspending transmission on a $k^{th}$ time domain resource after the first time domain resource, and k is a positive integer greater than or equal to 2.

All units in the device 300 provided in this application and the foregoing other operations or functions are separately used to implement corresponding procedures performed by the second device in the method 100 provided in this application. For brevity, details are not described herein again.

Figure 9:
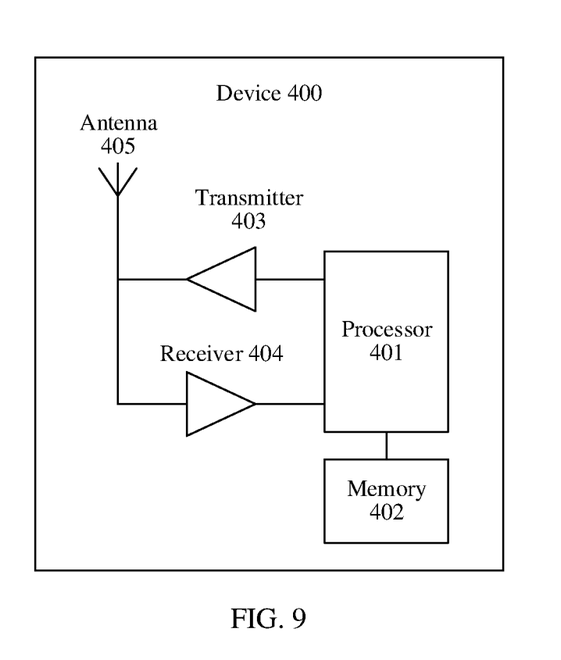
FIG. 9 is a schematic diagram of an example of a device for transmitting data according to an embodiment of this application.

FIG. 9 is a schematic diagram of another example of a device for transmitting data according to an embodiment of this application. As shown in FIG. 9, a device 400 includes: one or more processors 401, one or more memories 402, and one or more transceivers (each transceiver includes a transmitter 403 and a receiver 404). The transmitter 403 or the receiver 404 is connected to one or more antennas 405, and transmits and receives signals through the antennas. The memory 402 stores a computer program instruction (or code). The processor 401 performs a computer program instruction stored in the memory 402, to implement corresponding procedures and/or operations performed by the first device in the method 100 for communication provided in this application. Details are not described herein again.

It should be noted that the device 200 in FIG. 7 may be implemented by using the device 400 in FIG. 9. For example, a processing unit 210 shown in FIG. 7 may be implemented by the processor 401. A sending unit 201 may be specifically implemented by the transmitter 403, and a receiving unit 310 may be specifically implemented by the receiver 404.

Figure 10:
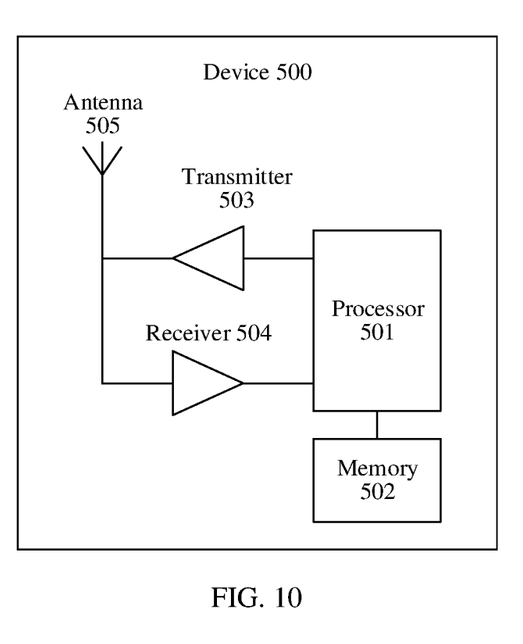
FIG. 10 is a schematic diagram of an example of a device for transmitting data according to an embodiment of this application

FIG. 10 is a schematic diagram of still another example of a device for transmitting data according to an embodiment of this application. As shown in FIG. 10, a device 500 includes: one or more processors 501, one or more memories 502, and one or more transceivers (each transceiver includes a transmitter 503 and a receiver 504). The transmitter 503 or the receiver 504 is connected to one or more antennas 505, and transmits and receives signals through the antennas. The memory 502 stores a computer program instruction (or code). The processor 501 performs a computer program instruction stored in the memory 502, to implement corresponding procedures and/or operations performed by the second device in the method 100 for communication provided in this application. Details are not described herein again.

It should be noted that the device 300 in FIG. 8 may be implemented by using the device 500 in FIG. 10. For example, a processing unit 310 shown in FIG. 3 may be implemented by the processor 501. A sending unit 310210 may be specifically implemented by the transmitter 503. A receiving unit may be specifically implemented by the receiver 504.

In the foregoing embodiments, a processor may be a central processing unit (CPU), a microprocessor, an application-specific integrated circuit (ASIC), or one or more integrated circuits that are configured to control performing a solution program in this application. For example, the processor may include a digital signal processor device, a microprocessor device, an analog-to-digital converter, a digital-to-analog converter, or the like. The processor may allocate control and signal processing functions of mobile devices among the foregoing devices according to a function of each of the foregoing devices. In addition, a processor may include a function of operating one or more software programs, and the software programs may be stored in a memory.

A memory may be a read only memory (ROM) or other types of static storage devices that may store static information and an instruction, or a random access memory (RAM) or other types of dynamic storage devices that may store information and an instruction, or may also be an electrically erasable programmable read-only memory (EEPROM), a compact disc read-only memory (CD-ROM) or other disc storage, an optical disc storage (including a compressed optical disc, a laser disc, an optical disc, a digital universal optical disc, a blue-ray optical disc, or the like), a magnetic disk storage or other magnetic storage devices, or any other medium that can be used to carry or storage an expected program code having an instruction or a data structure form and that may be read by a computer, but this is not limited herein. A memory may exist independently, or may be integrated with a processor.

A transceiver may include, for example, an infrared transceiver, a using transceiver, a universal serial bus (USB) transceiver, a Bluetooth transceiver, or the like. A first device may use a corresponding communication technology to send information (or a signal) by using a transmitter and/or receive information (or a signal) by using a receiver.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit 210, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   receiving, by a second device, higher-layer signaling from a first device, wherein the higher-layer signaling indicates a sending manner set, the sending manner set comprising a plurality of sending manners;
   receiving, by the second device, indication information from the first device, wherein the indication information indicates a first sending manner for a first transport block, and the first sending manner is one of the plurality of sending manners; and
   in response to receiving the indication information:
      receiving, by the second device, the first transport block according to the first sending manner; or
      sending, by the second device, the first transport block according to the first sending manner.

2. The method according to claim 1, wherein receiving the indication information from the first device comprises receiving, through physical layer signaling, the indication information from the first device.

3. The method according to claim 1, wherein each sending manner in the sending manner set corresponds to a time domain resource pattern, and wherein the time domain resource patter indicates one or more resources for a same transport block.

4. The method according to claim 3,
   wherein each time domain resource pattern is indicated by a bitmap, different bitmaps corresponding to different patterns, or
   wherein each time domain resource pattern is indicated by a quantity of time domain units.

5. The method according to claim 1,
   wherein the higher-layer signaling further indicates a respective feeding-back manner corresponding to each of the sending manners.

6. The method according to claim 5, wherein the respective feeding-back manner comprises: performing ACK feeding-back and skipping performing NACK feeding-back, skipping performing ACK feeding-back and skipping performing NACK feeding-back, or performing ACK feeding-back and performing NACK feeding-back.

7. The method according to claim 1, wherein receiving the first transport block according to the first sending manner comprises:
   detecting, on a first time domain resource according to the first sending manner, the first transport block sent by the first device; and
   sending, according to a result of detecting the first transport block, feedback information to the first device.

8. The method according to claim 1, wherein receiving the first transport block in the first sending manner comprises detecting, on a first time domain resource according to the first sending manner, the first transport block sent by the first device and wherein the method further comprises receiving update indication information sent by the first device, wherein the update indication information indicates adjusting or suspending transmission on a $k^{th}$ time domain resource after the first time domain resource, and k is a positive integer greater than or equal to 2.

9. The method according to claim 3, wherein the one or more resources is one time domain unit corresponding to one transport block, a plurality of successive time domain units corresponding to one transport block, or a plurality of non-successive time domain units corresponding to one transport block.

10. An apparatus comprising:
    a non-transitory storage medium storing executable instructions; and
    at least one processor, wherein the executable instructions, when executed by the at least one processor, cause the apparatus to:
       receive higher-layer signaling from a first device, wherein the higher-layer signaling indicates a sending manner set, the sending manner set comprising a plurality of sending manners;
       receive indication information from the first device, wherein the indication information indicates a first sending manner for a first transport block, and the first sending manner is one of the plurality of sending manners; and
       in response to receiving the indication information from the first device:
          receive the first transport block according to the first sending manner; or
          send the first transport block according to the first sending manner.

11. The apparatus according to claim 10, wherein the indication information is received through physical layer signaling from the first device.

12. The apparatus according to claim 10, wherein each sending manner in the sending manner set corresponds to a time domain resource pattern, and wherein the time domain resource pattern indicates one or more resources for a same transport block.

13. The apparatus according to claim 12,
    wherein each time domain resource pattern is indicated by a bitmap, or
    wherein each time domain resource pattern is indicated by a quantity of time domain units.

14. The apparatus according to claim 10, wherein the higher-layer signaling further indicates a respective feeding-back manner corresponding to each of the one or more sending manners.

15. The apparatus according to claim 14, wherein the respective feeding-back manner comprises performing ACK feeding-back and skipping performing NACK feeding-back, skipping performing ACK feeding-back and skipping performing NACK feeding-back, or performing ACK feeding-back and performing NACK feeding-back.

16. The apparatus according to claim 10, wherein the instruction to receive the first transport block according to the first sending manner comprises:
instructions to detect, on a first time domain resource according to the first sending manner, the first transport block sent by the first device; and
instructions to send, according to a result of detecting the first transport block, feedback information to the first device.

17. The apparatus according to claim 16, wherein instructions to receive the first transport block in the first sending manner comprises:
instructions to detect, on the first time domain resource according to the first sending manner, the first transport block sent by the first device and
wherein the executable instructions, when executed by the at least one processor, further cause the apparatus to:
receive update indication information sent by the first device, and wherein the update indication information indicates adjusting or suspending transmission on a $k^{th}$ time domain resource after the first time domain resource, and k is a positive integer greater than or equal to 2.

18. A non-transitory computer readable medium storing program codes for use by a terminal device for wireless communication, wherein the program codes comprise instructions for:
receiving, by a second device, higher-layer signaling from a first device, wherein the higher-layer signaling indicates a sending manner set, the sending manner set comprising a plurality of sending manners;
receiving indication information from the first device, wherein the indication information indicates a first sending manner for a first transport block, and the first sending manner is one of the plurality of sending manners; and
in response to receive the indication information:
receiving the first transport block according to the first sending manner; or
sending the first transport block according to the first sending manner.

19. The non-transitory computer readable medium according to claim 18, wherein receiving the indication information from the first device comprises receiving, through physical layer signaling, the indication information from the first device.

20. The apparatus according to claim 12, wherein the one or more resources is one time domain unit corresponding to one transport block, a plurality of successive time domain units corresponding to one transport block, or a plurality of non-successive time domain units corresponding to one transport block.

* * * * *